United States Patent [19]
Basse

[11] 3,896,389

[45] July 22, 1975

[54] SENSITIVE WIDE BAND VOLTMETERS

[75] Inventor: Philip Basse, Freeport, N.Y.

[73] Assignee: Comstron Corporation, Richmond Hill, N.Y.

[22] Filed: Dec. 17, 1973

[21] Appl. No.: 425,109

Related U.S. Application Data

[62] Division of Ser. No. 243,224, April 12, 1972, Pat. No. 3,810,015.

[52] U.S. Cl. ................. 328/151; 324/120; 328/135
[51] Int. Cl. ............................................. H03k 5/20
[58] Field of Search.................... 328/135, 150, 151; 307/235 R, 235 A; 324/120

[56] References Cited
UNITED STATES PATENTS

| | | | |
|---|---|---|---|
| 3,196,348 | 7/1965 | Parker | 324/120 |
| 3,199,030 | 8/1965 | Oxford et al. | 328/135 X |
| 3,665,304 | 5/1972 | Maybach | 328/151 X |

Primary Examiner—John Zazworsky
Attorney, Agent, or Firm—Arthur L. Plevy

[57] ABSTRACT

There is described a sensitive wide band voltmeter for measuring the amplitude of an AC signal. The voltmeter includes a mixing circuit having an input adapted to receive an AC signal. A sweep oscillator is capable of operating in a first mode for providing a relatively fast slope waveform and in a second mode responsive to the output of the mixer producing a frequency within a relatively narrow band. During the second mode the frequency difference signal from the mixer is detected and stored to provide an indication of the magnitude of the input AC signal.

A memory is utilized to provide a stable output indication. The memory is updated at the conclusion of each sweep cycle.

6 Claims, 6 Drawing Figures

SENSITIVE WIDE BAND VOLTMETERS

This is a divisional of application Ser. No. 243,224 filed on Apr. 12, 1972 and now U.S. Pat. No. 3,810,015 issued on May 7, 1974 and entitled SENSITIVE WIDE BAND VOLTMETERS.

This invention relates to signal amplitude measuring apparatus and more particularly to such apparatus useful for measuring signal amplitudes over a wide range of frequency.

BACKGROUND OF INVENTION

Presently there are a great number of instruments available which function to measure signal amplitude of an AC signal. These instruments are commonly referred to as voltmeters and are capable of operation over fairly wide frequency ranges. Depending upon the range of frequency accommodated, the voltmeter is further referenced as an audio or radio frequency type.

Most of these voltmeters are relatively conventional and utilize a detector arrangement, which provides a rectified current or DC output voltage. This current is then applied to a meter or other readout device to produce an indication proportional to the voltage applied to the input of the detector.

The types of voltmeters are also a function of the circuit configuration and can be referred to as diode or plate detection devices.

In any event the basic devices have been improved and now incorporate many additional desireable features such as automatic ranging, digital readouts and so on. However, present voltmeters omit many desirable operating features as the increase in technology has expanded faster than the voltmeter or measuring equipment art.

For example, most of these units are incapable of detecting high frequency, low amplitude signals with any reliability. In general, as the frequency of the input signal increases and as the amplitude decreases, the voltmeter's ability to respond decreases. Due to the new generation of sophisticated signal generators, receivers and other apparatus, it is desirable to perform accurate high frequency, low amplitude measurements.

It is therefore an object of this invention to provide an improved voltmeter apparatus capable of operating over a wide frequency range while providing accurate indications of signal amplitude.

BRIEF DESCRIPTION OF PREFERRED EMBODIMENT

Apparatus is provided for measuring the amplitude of an AC signal over a wide range of frequencies and capable of responding to low amplitude signals. The apparatus includes mixing circuit means having first and second input terminals, said first input terminal adapted to receive said AC signal to be measured; a variable oscillator, has a control input terminal adapted to receive a voltage to vary the frequency of said oscillator. An input terminal of the oscillator is coupled to the second input terminal of the mixing circuit to provide at the output of the mixing circuit a difference signal frequency; filter means coupled to the output of said mixing circuit are operative to pass a predetermined relatively narrow band of said difference frequencies, threshold means having an input terminal coupled to said filter means are responsive to said narrow band frequencies to provide a control voltage, the control voltage is applied to the oscillator control input terminal to decrease the rate at which the frequency of the oscillator is varied during the presence of said control voltage and indicator means responsive to the difference signal and coupled to the control means provides at an output a signal level indicative of said frequency difference signal during said decreased rate of said oscillator.

Further embodiments include apparatus for measuring the amplitude of an AC signal including a peak memory circuit which is coupled to said filter means and responsive to said difference signal to store a voltage during the presence of an output from said filter means, indicative of the amplitude of said AC signal.

DETAILED DESCRIPTION OF FIGURES

Figure 1A:
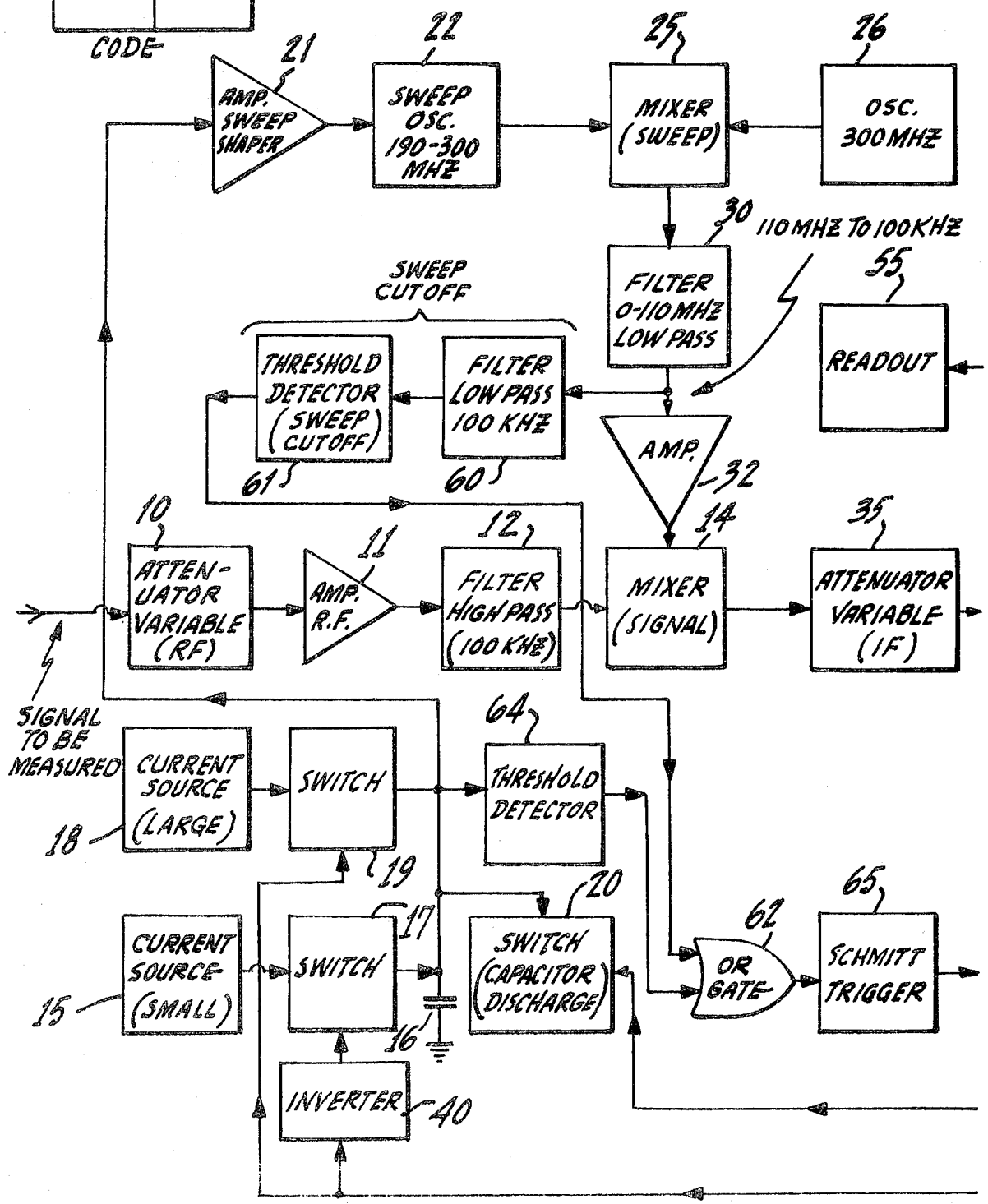
FIGS. 1a and 1b are a detailed block diagram of apparatus for measuring the amplitude of an AC signal according to this invention.
Figure 1B:
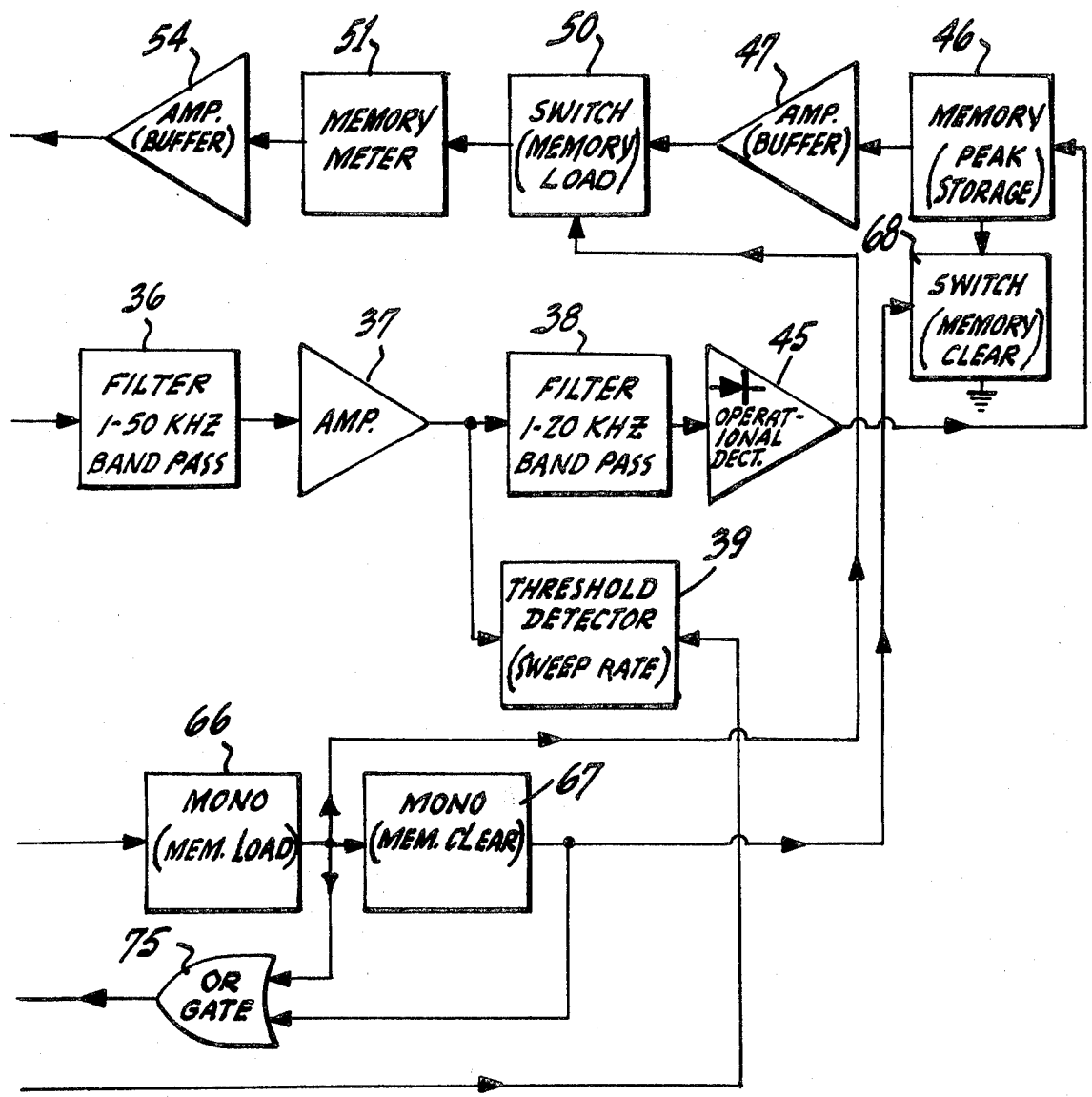

Referring to FIG. 1 there is shown a block diagram of a voltmeter according to this invention. There are various frequencies indicated on the diagram, which are useful in explaining operation, but which can, of course, vary without departing from the inventive concepts to be described herein.

A signal to be measured, which may be a relatively high frequency AC signal, in the range, for example, from 100 KHZ to 110 MHZ is applied to an input terminal of a variable radio frequency (RF) attenuator 10. The attenuator 10 is a stepped attenuator, wherein the input signal is selectively attenuated according to fixed decibel or other level. Such attenuators 10 can be manually operated or can be made to vary automatically by means of switching diodes and according to signal strength.

The output of the attentuator 10 is coupled to the input of a radio frequency (RF) amplifier 11. The amplifier 11 provides isolation and may further serve to provide a current or voltage gain of a fixed magnitude to the RF signal available at the output of the attenuator 10.

The output of the amplifier 11 is coupled to a high pass filter 12. The function of the high pass filter 12 is to prevent spurious signals from being applied to a signal mixer 14, and thence being applied to the intermediate frequency circuits or following bandpass filters.

The above description therefore specifies the signal path for the input signal, which is that signal whose amplitude is to be measured. The signal as processed is applied to a first input of the mixer 14. This mixer or down-converter 14 may be of the balanced type and therefore only providing an output when signals are applied to both input terminals.

The other terminal of the mixer 14 has a reference signal applied thereto, which signal is generated by a swept oscillator circuit output combined with a fixed frequency oscillator signal as follows:

A sweep circuit includes a constant current source 15, capable of providing a constant, relatively low magnitude current for charging a capacitor 16 via a switching circuit 17 during a second operating mode. A second constant current source 18 is also capable of charging capacitor 16 during a first operating mode, which will be described subsequently. This constant current source 18 is applied to the capacitor 16 via a selectively operated switch 19. The capacitor 16 is discharged via a discharge switch circuit 20 under the control of additional logic circuitry to be described.

The sweep or ramp waveform available across capacitor 16 is applied to an amplifier 21. The function of amplifier 21 is to provide isolation, while shaping the sweep waveform in order to compensate for any nonlinearity due to the capacitor charging waveform and so on. The output of the amplifier 21 is applied to a swept oscillator 22. Oscillator 22 may be of a conventional configuration capable of being frequency modulated by the sweep waveform. The oscillator 22 may include a variable reactance device, such as a variator diode, whose reactance varies according to a voltage applied thereto. In this manner the sweep waveform available at the output of the amplifier 21 varies the frequency of the oscillator 22 over a predetermined range. The frequency modulated oscillator signal is applied to one input of a sweep mixer circuit 25. The other input to the mixer circuit 25 is obtained via a fixed frequency oscillator 26.

The mixer circuit 25 may also be of the balanced type and will provide an output during the presence of the two input signals.

The output of the mixer circuit 25 is applied to a low pass filter circuit 30. The low pass filter 30 serves to select the lower product provided by the mixer 25 while discriminating against the high products and the signal available from oscillator 26 and the signal available from the swept oscillator 22. Thus filter 30 discriminates against these frequencies as well as unwanted mixing products. The output of the low pass filter 30 is applied to the other input of the mixer 14 via an isolation amplifier 32.

The output from mixer 14 is applied to an attenuator 35, which is a variable attenuator similar to the attenuator 10, but operative at a lower frequency. The output of the attenuator 35 is coupled to a bandpass filter 36. The bandpass filter 36 functions as an intermediate frequency (IF) stage and operates to select any one of a range of frequencies within a predetermined low frequency range. Thus when the difference in frequency between the input signal amplifier 11 and the signal via amplifier 32 is within the bandpass of filter 36 an output signal is provided. This signal is applied to an isolation amplifier 37. The output from the amplifier 37 is coupled to the input of still another bandpass filter 38, having a narrower bandpass than filter 36, and to the input of a threshold detector or sweep rate detector 39. It is the sweep rate threshold detector 39, as will be explained, that controls the charging of the sweep capacitor 16 via switches 17 and 19. Hence the output of the threshold detector 39 is coupled to the switch 19 associated with current source 18; and to switch 17 associated with current source 15 via an inverter 40. The threshold detector 39 may be a differential amplifier configuration or another typical threshold detection circuit, many examples of which exist in the prior art.

The output of the bandpass filter 38 is coupled to the input of a detector circuit 45. The detector circuit 45 serves to convert the AC signal at its input to a DC signal at its output. Detector 45 may be an operational amplifier detector configuration, to provide good linearity, while because of the large open loop response, increased sensitivity.

The output of the operational detector circuit 45 is coupled to a peak memory storage circuit 46. The function of the storage circuit 46 is to store the DC output of the detector 45 representative of the peak amplitude AC applied to the detector 45. The memory 46 may be a field effect storage circuit, or a typical capacitor store transistor circuit. Many memory circuits for doing this are known in the art.

The output of the memory 46 is applied to a buffer amplifier 47. The buffer amplifier 47 has the output terminal coupled to the input of a memory load switch circuit 50. The output of the switch 50 is coupled to another memory circuit 51. The function of memory 51 is to supply a signal to a readout device 55 via amplifier 54. The readout device 55 may be a conventional d'Arsonval DC meter, that requires a current of the order of 0.1 to 1.0 ma to produce full-scale deflection, or may be a digital readout device. Many suitable meters are known and available.

Both memories 46 and 50 are controlled according to the status of the mixer circuits and the sweep signals by the following logic circuitry:

Coupled to the low pass filter 30 is another low pass filter 60 having a narrower bandpass than filter 30. The output of filter 60 is applied via a sweep cutoff threshold detector 61 to an input of an OR gate 62. Another input to OR gate 62 is supplied via another detector 64 having an input coupled to capacitor 16. The output of OR gate 62 is applied to the input of a schmitt trigger circuit 65. The output of the schmitt trigger 65 is applied to the memory load switch 50 via a monostable multivibrator 66 or one-shot 66. The output of the monostable 66 is applied to another monostable 67 which multivibrator controls the operation of the peak storage memory 46 via a memory clear switch 68.

The outputs of both monostables 66 and 67 are applied to respective inputs of an OR gate 75, whose output is used to control the sweep switch discharge circuit 20.

OPERATION OF THE VOLTMETER

Assume that the signal to be measured is of a frequency of 10,000,000 cycles per second or 10 MHZ. It is noted at the onset that the frequency is only typical as are the other frequency values to be described herein, and the unit can operate over a plurality of different frequency ranges by changing parameters herein, but by using the basic apparatus provided by this invention.

Initially the current source (LARGE) 18 is coupled to the capacitor 16 and causes a ramp to be developed thereacross. This ramp is applied to a central input of oscillator 22 whose frequency is swept upward from, in this example, 190 to 300 MHZ due to the application of the ramp to a variable reactance device. The filter 30 passes only the difference frequency or the lower frequency product which is in the range of 0 to 110 MHZ. The difference frequency being determined by the difference between the frequency of oscillator 22 and oscillator 26. This frequency is applied to mixer 14 via amplifier 32.

The sweep oscillator starts at the low frequency end of 190 MHZ and is being swept upward. If the sweep oscillator commences operation at 190 MHZ the output of mixer 30 will be 110 MHZ, as the frequency of oscillator 22 is raised, the mixer 30 providess an output which approach the frequency of 10 MHZ. Therefore, oscillator 22 is swept upward, while the output of mixer 25 goes down in frequency accordingly. provides When the oscillator 22 is at a frequency of 289.950 MHZ the low product output of mixer 25 is 10.05 MHZ and is passed through filter 30 and applied to mixer 14. Therefore, the difference output from mixer 14 is 50,000 HZ. This signal is propogated via attenuator 35 and the bandpass filter 36. The signal at the output of amplifier 37 serves to activate the sweep rate threshold detector 39.

The activation of the sweep rate detector inhibits the current source (LARGE) 18 from charging capacitor 16 and simultaneously enables current source 15 (SMALL) via switch 17 and inverter 40 to thereby charge capacitor 16 at a slower rate.

As the oscillator 22 continues to sweep upward at the lower rate the filter 38 will also begin to pass signals and these signals are detected by detector 45 and stored in the memory 46. Memory 46 stores the largest peak value occurring within the bandpass of filter 38. As oscillator 22 is swept from 289.95 towards 289.98 MHZ, the output of mixer 14 goes from 50 KHZ to 20 KHZ. This (20 KHZ) specifies a frequency within the bandpass of filter 38. As the frequency of oscillator 22 is raised at the slow rate the output signal of mixer 14 decreases in frequency until oscillator 22 is at 290 MHZ, indicating a zero frequency output of mixer 14. Before this frequency, however, (at 1,000 HZ) the bandpass filters 36 and 38 do not pass any further signals. The detector 39 is released causing the sweep rate to change back to the large current source control. As soon as the oscillator 22 frequency increases to 299.90 MHZ, the filter 60 and threshold detector 61 operate. The sweep cut-off detector 61 then activates the schmitt trigger 65 via the OR gate 62. Activation of the schmitt trigger 65 causes the monostable 66 to trigger. This triggering of the monostable 66 serves to rapidly discharge capacitor 16 via discharge circuit 20 and to further inhibit charging of the capacitor 16 during the duration of the pulse afforded by one shot 66. This therefore prevents the oscillator 22 from being swept. The one shot 66 also enables the memory load switch 50 thus transferring the information stored in peak memory 46 to the meter memory 51, to thereby provide a reading of the voltage detected due to the 10 MHZ input signal.

At the termination of the period provided by the monostable 66, the monostable 67 is triggered. This also inhibits charging of capacitor 16 through the action of OR gate 75, as above described, and further removes all information stored in memory 46 by activating the memory clear switch 68.

At the termination of the period provided by monostable 67, the sweep circuit is again enabled and another detection cycle, as above described, commences.

Thus at the end of the cycle the output detected via detector 45 is stored and is a linear function of the largest spectral component of the input singal. It is this component that is indicated and provided as a reading via the readout 55, which may be a digital or analog type device.

Certain protective features are also incorporated in this unit. If for example the sweep cutoff is not activated by filter 60 and threshold detector 61, the threshold detector 64 which is monitoring the sweep ramp will be activated.

The detector 64 serves to trigger the monostables 66 and 67 to therefore discharge the capacitor 16 and hence initiates the normal instrument operating mode. This condition may occur during turn on of power to the above described circuitry or during a large transient condition.

Figure 2:
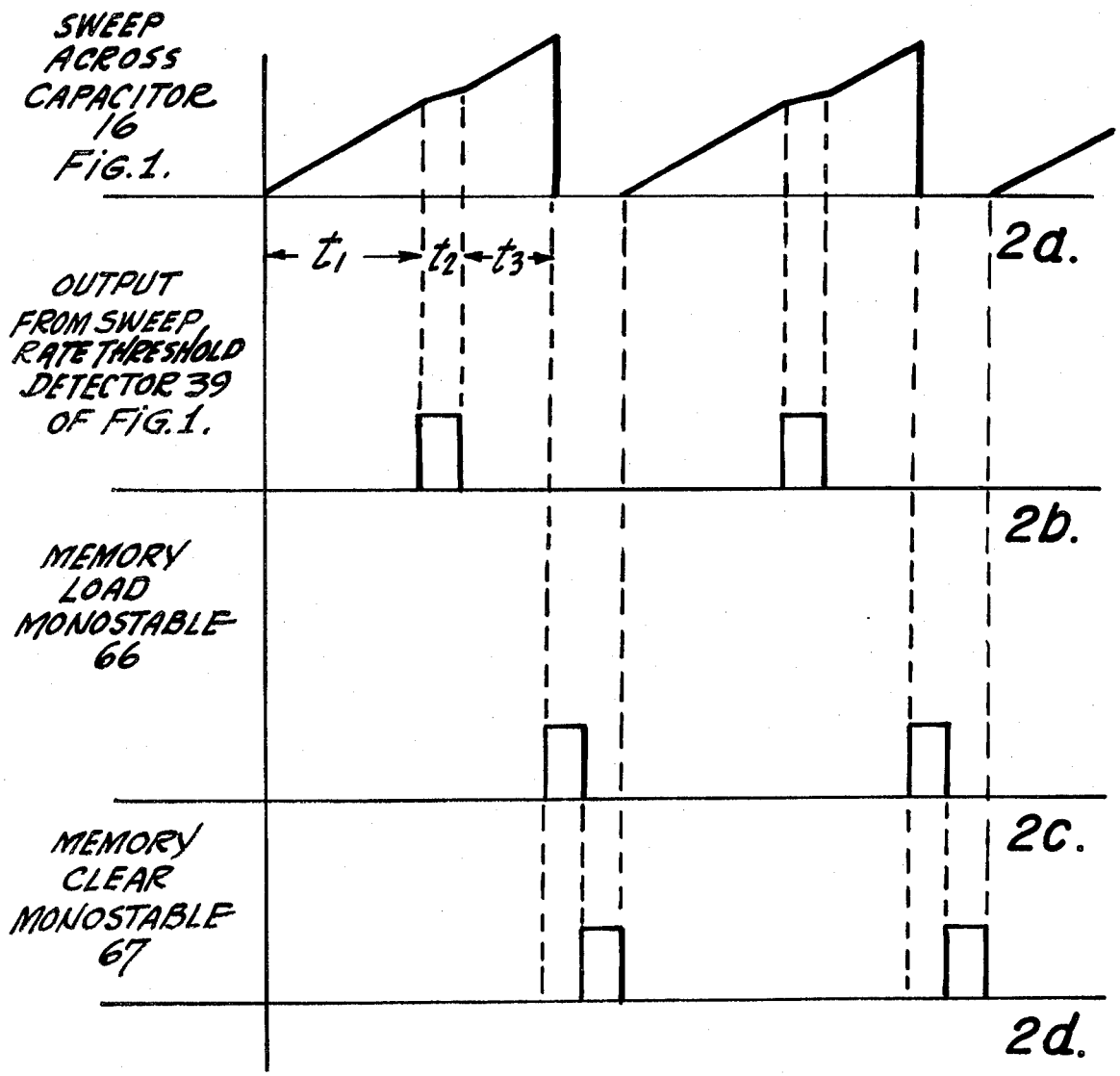
FIGS. 2, A to D are a series of timing wave shapes useful in explaining the operation of the configuration shown in FIGS. 1a and 1b.

Referring to FIG. 2 there is shown a series of timing diagrams specifying the output waveforms during various operating modes of the above described apparatus.

FIG. 2A shows the dual slope ramp, or sweep developed across capacitor 16 of FIG. 1, during the operation of filter 36 and the sweep rate threshold detector 39 of FIG. 1.

The shape of the ramp during the interval ti is derived from charging capacitor 16 via the large current source. As soon as the threshold detector 39 is activated due to a passing of a low frequency component via filter 36, the slope is changed and remains the lower valve during the threshold detector 39 operation as shown in FIG. 2B. When the sweep cutoff circuits are activated, operation of the monostables 66 and 67 commences as are shown in FIG. 2C and 2D respectively. It is noted that during the combined time of monostables 66 and 67 the ramp is inhibited and thus oscillator 22 is not swept. After monostable 67 ceases providing the fixed period duration the normal cycle commences.

I claim:

1. Apparatus for measuring the amplitude of an AC signal of the type including a down-converter for producing another signal indicative of said AC signal at a lower frequency in combination therewith apparatus for indicating the magnitude of said signal, comprising:
    a. means responsive to said another signal for providing a control signal when said signal is within a predetermined frequency range,
    b. memory means coupled to said means and operative to store a value indicative of said another signal during the presence of said control signal.

2. The apparatus according to claim 1 wherein said memory means includes a peak detector circuit having an input responsive to said another signal for providing at an output a level indicative of the peak value thereof.

3. Apparatus for measuring the amplitude of an AC signal comprising:
    a. a frequency modulatable oscillator having an output terminal and a control input terminal for application thereto of a sweep voltage for varying the frequency at said output terminal over a predetermined range;
    b. means for providing a sweep voltage waveform at an output terminal, said output terminal coupled to said control input terminal of said oscillator for varying the frequency thereof, said sweep voltage waveform characterized in that said waveform has a portion of a given slope and a discharge portion representing a termination of said sweep voltage,
    c. mixing means coupled to said oscillator and responsive to said AC signal to provide at an output a mixing product signal having an amplitude indicative of said AC signal,
    d. means responsive to the termination of said sweep voltage waveform to store the magnitude of said mixing product signal and therefore a value indicative of the amplitude of said AC signal.

4. The apparatus according to claim 3 wherein said means responsive to the termination of said sweep waveform includes a peak detector circuit responsive to the peak amplitude of said mixing product signal.

5. Apparatus for measuring the amplitude of an AC signal comprising:
   a. a source of reference signals,
   b. combining circuit means responsive to said AC signal and said reference signals to provide at an output thereof, a signal indicative of the frequency difference therebetween,
   c. control means coupled to the output of said combining means and operative to provide a control voltage when said difference is within a predetermined range,
   d. storage circuit means coupled to said control means, coupled to said combining means and responsive to said control voltage to store the peak value of said difference signal during the presence of said control voltage,
   e. threshold means coupled to said combining circuit means and operative to provide a second control voltage when said frequency difference signal is not within said predetermined range, and
   f. memory means coupled to said threshold means and to said storage circuit means and responsive to said second control voltage to store said stored peak value of said difference signal during the presence of said control voltage.

6. The apparatus according to claim 5 wherein said storage circuit means further includes:
   a. a peak detector circuit having an input coupled to the output of said combining means and an output terminal,
   b. a peak memory storage device having an input terminal coupled to the output terminal of said peak detector means and an output terminal coupled to said indicator means.

* * * * *